(12) United States Patent
Mannix (10) Patent No.: US 12,293,413 B2
(45) Date of Patent: May 6, 2025

(54) NETWORK CHANNEL WITH LEVELIZED AND RANDOMIZED LATENCY

(71) Applicant: Tamer Trading Technologies LLC, Gainesville, VA (US)

(72) Inventor: Brian F. Mannix, Gainesville, VA (US)

(73) Assignee: TAMER TRADING TECHNOLOGIES LLC, Gainesville, VA (US)

( * ) Notice: Subject to any disclaimer, the term of this patent is extended or adjusted under 35 U.S.C. 154(b) by 122 days.

(21) Appl. No.: 17/978,830

(22) Filed: Nov. 1, 2022

(65) Prior Publication Data

US 2023/0134501 A1 May 4, 2023

Related U.S. Application Data

(60) Provisional application No. 63/274,688, filed on Nov. 2, 2021.

(51) Int. Cl.
*G06F 15/16* (2006.01)
*G06Q 40/04* (2012.01)

(52) U.S. Cl.
CPC .................... *G06Q 40/04* (2013.01)

(58) Field of Classification Search
CPC ...................................... G06Q 40/04
USPC ....................................... 709/233
See application file for complete search history.

(56) References Cited

U.S. PATENT DOCUMENTS

| 5,771,241 | A  | * | 6/1998  | Brummel  | G01R 31/31813 |
|           |    |   |         |          | 714/E11.166 |
| 6,618,707 | B1 | * | 9/2003  | Gary     | G06Q 40/00 |
|           |    |   |         |          | 705/36 R |
| 6,965,581 | B2 | * | 11/2005 | Nguyen   | H04B 7/1858 |
|           |    |   |         |          | 370/278 |
| 7,043,025 | B2 | * | 5/2006  | Alldredge | H04L 9/16 |
|           |    |   |         |          | 705/68 |
| 7,099,438 | B2 | * | 8/2006  | Rancu    | H04W 24/06 |
|           |    |   |         |          | 379/9.02 |
| 7,164,661 | B2 | * | 1/2007  | Kelly    | H04B 7/18578 |
|           |    |   |         |          | 455/430 |

(Continued)

OTHER PUBLICATIONS

Mannix, "Space-Time Trading: Special Relativity and Financial Market Microstructure," https://regulatorystudies.columbian.gwu.edu/space-time-trading-special-relativity-and-financial-market-microstructure, 2016.

(Continued)

*Primary Examiner* — Alicia Baturay
(74) *Attorney, Agent, or Firm* — McCarter & English, LLP; Michael A. Sartori (57) ABSTRACT

A computer-implemented method, performed by a network node in a communication network, for inducing latency in data transmission, the method comprises receiving a data message over the communication network, determining a latency on the data message for further transmission over the communication network, wherein the latency is based on a predetermined fixed value plus a random value, buffering the data message for an amount of time based on the determined latency, and at least one of transmitting the data message over the communication network or processing the data message once buffering is complete.

20 Claims, 4 Drawing Sheets

(56) References Cited

U.S. PATENT DOCUMENTS

| | | | | |
|---|---|---|---|---|
| 7,685,052 | B2* | 3/2010 | Waelbroeck | G06Q 40/04 705/37 |
| 7,840,482 | B2* | 11/2010 | Singla | G06Q 40/06 705/37 |
| 7,962,401 | B2* | 6/2011 | Bertilsson | H04L 67/1001 705/37 |
| 8,165,954 | B2* | 4/2012 | Waelbroeck | G06Q 40/04 705/37 |
| 8,484,121 | B2* | 7/2013 | Balabon | G06Q 40/00 705/37 |
| 8,774,407 | B2* | 7/2014 | Eklund | G06F 21/72 380/255 |
| 8,924,278 | B2* | 12/2014 | Farrell | G06Q 40/04 705/37 |
| 8,977,565 | B2* | 3/2015 | Alderucci | G06Q 40/06 705/37 |
| 9,727,602 | B2* | 8/2017 | Djurdjevic | G06F 16/235 |
| 10,127,612 | B2* | 11/2018 | Mannix | G06Q 40/00 |
| 10,694,370 | B2* | 6/2020 | Dunjic | G06Q 20/3223 |
| 11,088,959 | B1 | 8/2021 | Amicangioli et al. | |
| 11,263,694 | B2* | 3/2022 | Mannix | G06Q 40/00 |
| 11,395,134 | B2* | 7/2022 | Dunjic | G06Q 20/08 |
| 11,645,380 | B2* | 5/2023 | Chittamuru | H04L 9/0866 726/2 |
| 11,824,790 | B2* | 11/2023 | Bonig | G06Q 40/04 |
| 12,206,552 | B2* | 1/2025 | Guim Bernat | H04W 4/08 |
| 2001/0043574 | A1 | 11/2001 | Nguyen et al. | |
| 2005/0108141 | A1 | 5/2005 | Farrell et al. | |
| 2005/0234805 | A1* | 10/2005 | Robertson | G06Q 30/08 705/37 |
| 2007/0022040 | A1* | 1/2007 | Gordon | G06Q 40/04 705/37 |
| 2008/0175239 | A1* | 7/2008 | Sistanizadeh | H04L 12/18 370/390 |
| 2010/0332368 | A1* | 12/2010 | Alderucci | G06Q 40/04 705/37 |
| 2011/0137785 | A1* | 6/2011 | Lutnick | G06Q 40/04 705/37 |
| 2011/0137786 | A1* | 6/2011 | Lutnick | G06Q 40/04 705/37 |
| 2016/0364437 | A1 | 12/2016 | Djurdjevic et al. | |
| 2017/0367023 | A1 | 12/2017 | Demchenko | |
| 2019/0087898 | A1 | 3/2019 | Mannix | |
| 2019/0311433 | A1 | 10/2019 | Schmitt et al. | |
| 2020/0125716 | A1 | 4/2020 | Chittamuru et al. | |
| 2021/0144517 | A1 | 5/2021 | Guim Bernat et al. | |

OTHER PUBLICATIONS

"Races, Rushes, and Runs: Taming the Turbulence in Financial Trading," George Washington University, Regulatory Studies Center, regulatorystudies.columbian.gwu.edu/races-rushes-and-runs-taming-turbulence-financial-trading. Jan. 4, 2013.
Interntional Search Report issued in PCT/US22/48701 dated Mar. 2, 2023.
Supplementary European Search Report issued in EP Application No. 22 89 0719 dated Dec. 16, 2024.

* cited by examiner

NETWORK CHANNEL WITH LEVELIZED AND RANDOMIZED LATENCY

PRIORITY

This application claims priority to U.S. Provisional Application No. 63/274,688, filed Nov. 2, 2021, which is incorporated herein by reference.

BACKGROUND

Inefficiencies arise in markets characterized by asymmetrical information. Automated trading systems operating on a computer network can be particularly susceptible to this market failure. Transient information asymmetries are ubiquitous on electronic networks and drive the race-to-trade, an unproductive and wasteful competition to exploit infinitesimal advantages in the speed of communication.

SUMMARY

As described above, transient information asymmetries cause inefficiencies in financial markets operating on electronic networks. Certain aspects of the present disclosure and their embodiments can help mitigate these inefficiencies and help provide solutions to related challenges. For example, particular embodiments include a method of communication on a network, providing a channel with levelized and randomized latency, for the purpose of, for example, discouraging racing in particular markets.

In some embodiments, a computer-implemented method, performed by a network node in a communication network, for inducing latency in data transmission, the method may comprise receiving a data message over the communication network; determining a latency on the data message for further transmission over the communication network, wherein the latency is based on a predetermined fixed value plus a random value; buffering the data message for an amount of time based on the determined latency; and at least one of transmitting the data message over the communication network or processing the data message once buffering is complete.

In some embodiments, a system may comprise one or more processors and memory accessible by the one or more processors, the memory storing instructions that when executed by the one or more processors cause the system to perform a method comprising receiving a data message over the communication network; determining a latency on the data message for further transmission over the communication network, wherein the latency is based on a predetermined fixed value plus a random value; buffering the data message for an amount of time based on the determined latency; and at least one of transmitting the data message over the communication network or processing the data message once buffering is complete.

In some embodiments, one or more tangible non-transitory computer-readable storage media for storing computer-executable instructions executable by a computer system having at least one processor, the media storing one or more instructions to receive a data message over the communication network; determine a latency on the data message for further transmission over the communication network, wherein the latency is based on a predetermined fixed value plus a random value; buffer the data message for an amount of time based on the determined latency; and at least one of transmit the data message over the communication network or process the data message once buffering is complete.

BRIEF DESCRIPTION OF THE DRAWINGS

The foregoing and other features and advantages of the invention will be apparent from the following, more particular description of various exemplary embodiments, as illustrated in the accompanying drawings wherein like reference numbers generally indicate identical, functionally similar, and/or structurally similar elements. The first digits in the reference number generally indicates the drawing in which an element first appears.

DETAILED DESCRIPTION

Certain challenges currently exist with transient information asymmetries on electronic networks. To understand how encrypted latency can be beneficial, it is important to be clear about the problem it is trying to solve.

As recognized by the inventor, markets for digital assets are plagued by a fundamental market failure, known to economists as "information asymmetry." Transient information asymmetries are ubiquitous in digital markets and may cause a race to trade that wastes enormous amounts of energy, as well as capital. The "proof of work" mechanism for some cryptocurrencies is another example of redundant effort that can waste real resources. Even if the electricity used for mining digital assets was entirely free of environmental externalities, it would most likely still be mostly wasted. Other risks loom, including dangerous overcrowding of satellites in low earth orbit if they become part of the arms race for temporal advantage in financial trading.

The development of digital assets and distributed ledger technology has raised the prospect of substantial benefits, but also some important technical challenges, including a fundamental dilemma. The one thing that a financial ledger is expected to do is record an unambiguous sequence of transactions, or events. However, spatially separated events may not have an unambiguous sequence. See Mannix, "Space-Time Trading: Special Relativity and Financial Market Microstructure," https://regulatorystudies.columbian.gwu.edu/space-time-trading-special-relativity-and-financial-market-microstructure, 2016. For this reason, decentralized ledgers may need some kind of consensus process to resolve irreducible space-time ambiguities, and that process may necessarily impose speed limits on the pace of transactions.

The speed of light is plenty fast enough for humans conducting business around the world; so this relativistic constraint would be just an interesting footnote to the story, except for two things. First, it is possible to exploit the ambiguity of sequencing by, for example, deliberately sending instructions to spend the same digital coin on opposite sides of the planet at the same time. The distributed ledger system may need to be able to detect such hacks, which may take much more elaborate forms.

The more intractable problem is that, quite apart from such obviously dishonest hacks, high-speed digital markets may be extremely susceptible to the problem of latency racing and its associated inefficiencies, due to the ubiquity of transient information asymmetries.

Another danger that latency racing may cause catastrophic overcrowding in low earth orbit, as too many redundant laser-linked satellites are launched, in orbits that may be too low, in order to serve high-speed traders who are seeking the shortest possible great-circle pathway through the vacuum of space.

As one example of information asymmetry, when the Bureau of Labor Statistics (BLS) releases the latest unemployment figures, it takes pains to make them accessible to everyone at once, in accord with United States Statistical Policy Directives issued by the Office of Management and Budget. This is a laudable goal, but also one that is physically impossible. Information cannot propagate across space faster than the speed of light. In practice, large financial and/or news companies consistently access the BLS data first and transmit it at high speed to client computers in New Jersey collocated with the major trading venues there. They can do this because they have made substantial investments in high-speed computing and proprietary communication infrastructure. For a fraction of a second, the public information from BLS can be exploited profitably by the small subset of traders that are able to access the information, and the market, the fastest.

Similarly, the latest crop reports from the United States Department of Agriculture (USDA) have substantial trading value before they are universally known. But in the first few milliseconds after their release, they cannot be universally known. Data released in Washington D.C. is quickly transmitted to commodity markets in Chicago as well as New York, where algorithmic trading systems exploit the temporary advantage it gives them to profit at the expense of less well-informed traders. In such zero-sum games, the gains of the winners are not simply offset by the losses of the losers; they are also offset by the real resources expended by all to engage in the latency race. USDA has taken steps, with limited success, to disrupt the race to trade on its data; indeed, all of the federal statistical agencies are struggling with the problem of how to release data more fairly.

High-speed traders sometimes use the Efficient Market Hypothesis (EMH) to argue that they are making markets more efficient. But the EMH addresses only the static efficiency of prices; it says nothing about the efficient speed of reaching those prices, especially when speed is costly. In fact, there is no economic efficiency justification for the substantial cost of getting access to public data a microsecond faster than a rival is able to get it. The real resources expended in that effort are a manifestation of waste, caused by transient information asymmetries that are difficult to avoid in a world where communication approaches light speed.

Releases of government data are only one example of public (or soon-to-be public) information that has temporary trading value while it propagates unevenly through space. Probably some of the most important such data are the so-called market data thrown off by the trading venues themselves—information about rapidly changing prices and quantities of recent transactions and pending bids and offers. The advantage of rapid access to market data is what keeps algorithmic traders tightly clustered around trading venues. One might have expected that, with the advent of public high-speed communication networks, trading might have moved to "the cloud"—offsite data centers with fast access to those networks. To some degree, that has happened. But a more prominent trend is the move towards ever more tightly concentrated market clusters—equity markets in New Jersey, commodities in Chicago, currencies in London—and to a web of proprietary communications infrastructure that pushes ever closer to the speed of light.

Initially latency racing took place on electronic circuits; these were quickly superseded by faster fiber optic networks. The speed of light is faster in air than it is in glass, however, so microwave networks have been built to outrace the fiber; and, over shorter distances, hollow fiber has begun to displace solid glass fiber.

The latency race will soon be entering a new phase. The latest development in high-speed long-distance communication is the launch of constellations containing thousands of low earth orbit (LEO) satellites, connected to each other by lasers in the vacuum of space, where light reaches its maximum speed. These satellite systems will provide a wide range of communication services. But latency arbitrage in financial markets is likely to be a major influence on the configuration of these communication systems, just as it has been on the ground.

The National Oceanographic and Atmospheric Administration (NOAA) is tasked with regulating the safe commercial use of space and is wrestling with the risks that may arise from overcrowding in low earth orbit. Coincidentally, NOAA also regulates ocean fisheries, and therefore is very familiar with the "race to fish" that occurs in poorly regulated fisheries; racing in both fisheries and financial markets can result in "overcapitalization," a wasteful investment in an unproductive competition for speed.

The Federal Trade Commission is concerned about congestion in the radio frequencies used to communicate between earth and space. The Defense Department is concerned about the risk of satellite collisions and debris cascades. The present disclosure regarding the use of levelized and randomized latency will not resolve all of these concerns, but can help mitigate them by ensuring that latency races in space do not cause a wasteful and dangerous overinvestment in communication satellite infrastructure and operations.

Certain aspects of the present disclosure and their embodiments may provide solutions to these or other challenges. For example, particular embodiments include a method of communication on a network, providing a channel with levelized and randomized latency, for the purpose of, for example, discouraging racing in particular markets.

Messages delivered through the channel have a latency that is, within a certain range, unpredictable. The arrival time of a message at its destination conveys no information about the location where the message originated; in this sense, it may be referred to as "encrypted" latency. Within the geographic footprint of the encrypted-latency channel, all points on the network are effectively equidistant from one another.

As one example, when executable orders for financial trading are transmitted through such an encrypted-latency channel, with the restriction that such orders may be crossed only with other orders that are similarly transmitted, the result is a level playing field that confers no latency advantage to traders at any particular geographic location.

This not only provides more flexibility in, for example, locating trading operations, it also provides more flexibility in, for example, locating financial exchanges (e.g., matching engines). Exchanges need not be clustered together, as they tend to be today, and algorithmic trading machines need not be collocated with the exchanges. When conducted through encrypted latency channels, financial trading may take place in a virtual "space-time cloud" that is, within limits, both spatially and temporally agnostic.

An encrypted latency channel may exist side-by-side with faster communication channels. This allows information to travel through a network faster than does trading activity, so that transient information asymmetries will dissipate before they can be exploited.

An encrypted-latency channel may be constructed on various types and sizes of communication networks. For example, a channel with an average latency of less than a millisecond, on a microwave network in northern New Jersey, may encompass all of the existing stock exchanges in the United States. On a larger scale, a channel with an average latency of a few of hundred milliseconds, on a constellation of laser-linked satellites in low earth orbit, may encompass the entire planet, providing customers with the ability to trade, with no latency handicap, from anywhere on earth.

The use of encrypted latency may not be something that needs to be mandated. Trading platforms that take advantage of encrypted latency communication should be able to coexist, and compete, with platforms that do not. An advantage of an encrypted latency channel is that it inhibits wasteful latency races based on transient information asymmetries. Traders using an encrypted latency channel are effectively agreeing that temporal priority at the matching engine will be established, not according to who has access to the fastest equipment, but by lottery, i.e., by the random component of the encrypted latency.

Within its geographic footprint, an encrypted-latency channel on a communications network conveys messages with an imposed latency that has approximately the same expected value, regardless of the point of entry and point of delivery. But the latency will not be uniform; it has a minimum value and a maximum value, and a random distribution in between.

Alternatively, the encrypted latency can be thought of as being the sum of a fixed component (the minimum latency) and a random component. Along with the properties of the underlying communication technology, the fixed component effectively defines the geographic "footprint" of the channel; it must be long enough to allow the network to deliver a message between any two points in the footprint within that timeframe. The random component of the latency has a distinct function: it makes the total latency unpredictable to discourage wasteful investment in latency racing.

The operator of a communications network may implement an encrypted latency channel by using smart routers or similar devices to route traffic through the network. After a message has been submitted to the channel, in some embodiments, the routers assign it a latency (consisting of fixed and a random component) and then dispatch the message to its destination by a route that achieves the assigned latency. In some embodiments, the routers do this by using a combination of electronic buffers, optical buffers (such as coils of fiber, in various lengths), and otherwise idle network capacity (an order traveling from Manhattan to New Jersey might, for example, get there, in part, via a laser beam between satellites over Patagonia). When delivered to its destination, the message arrives in a form that enables the recipient to verify that it was, in fact, subject to encrypted latency prior to its arrival.

In some embodiments, the latency may be assigned closer to the destination of a message, rather than at its origination point. For example, when the message is accepted into the channel, it receives only a verifiable time stamp. When the message arrives at, or close to, its destination, that time stamp can be used to determine how much additional delay needs to be added in order to meet the channel's minimum fixed latency requirement. And a random delay can be added then as well. With this embodiment, it would be possible for a trading venue, for example, to offer the encrypted latency channel to market participants without requiring it to be tied to any particular communications network. For example, a trading venue might use this embodiment to create an encrypted latency channel that operated across multiple providers of satellite communications or other methods of communication.

Encrypted latency is distinct from merely levelized latency, which is an old technology. Random Access Memory (RAM) is an example of "levelized latency" because the access time, or latency, is the same regardless of the memory address, or location. This is to distinguish RAM from such media as magnetic tapes and disks, or optical disks, where the access time is very much dependent on the location of the data. In contrast, an encrypted latency channel as described herein not only levelizes the latency but also may add a random component. The random component may have the effect of discouraging latency racing.

For more detail on the underlying rationale for the use of a random delay (or "speedbump") in financial trading, see Mannix, "Races, Rushes, and Runs; Finding, and Fixing, Inefficiency in Financial Trading," George Washington University, Regulatory Studies Center, regulatorystudies.columbian.gwu.edu/races-rushes-and-runs-taming-turbulence-financial-trading. Jan. 4, 2013. For more on the effect of special relativity on trading, see Mannix, "Space-Time Trading: Special Relativity and Financial Market Microstructure," George Washington University, Regulatory Studies Center, regulatorystudies.columbian.gwu.edu/space-time-trading-special-relativity-and-financial-market-microstructure, Feb. 11, 2016. Also see U.S. Pat. Nos. 10,127,612 and 11,263,694.

Many investors will view the encrypted latency playing field as fairer than the race-to-trade system that prevails today. But the efficiency arguments may be even more compelling. By reducing the private rewards of racing behaviour and the greater private losses by slower traders, encrypted latency can reduce the net social costs—which likely exceed $100 billion per year across global markets—that arise from transient information asymmetries in financial markets.

In addition to improved trading efficiency, encrypted latency can help address some other related aspects of financial markets that have recently raised concerns. By slightly slowing the pace of trading (and thereby decoupling it from the pace at which public information propagates), encrypted latency can improve market stability and help suppress flash crashes. It will likely reduce the growth of PFOF: payment (by high-speed traders) for exploitable order flow. By suppressing an unproductive competition for speed at the bleeding edge of what is technologically possible, it should help avoid overcrowding of satellites in low earth orbit, and congestion in associated radio frequency communications. By ensuring that communication can take place faster than trade execution, encrypted latency channels can help cryptocurrencies avoid variations of the "racing hack"—an attempt to spend the same coin on opposite sides of the planet at the same time. Encrypted latency channels may also be helpful in finding ways to reduce the excessive electricity use (and associated $CO_2$ emissions) caused by redundant efforts to mine cryptocurrencies. In virtual worlds, encrypted latency channels can provide a stable and secure platform for financial transactions even as other types of virtual interactions take advantage of full-speed communication channels. More generally, encrypted-latency communications can enable the development of delocalized finance ("DelFi")— a version of decentralized finance ("DeFi") that delocalizes transactions in time as well as space, in recognition of the physical reality that the two are inextricably intertwined.

Figure 1:
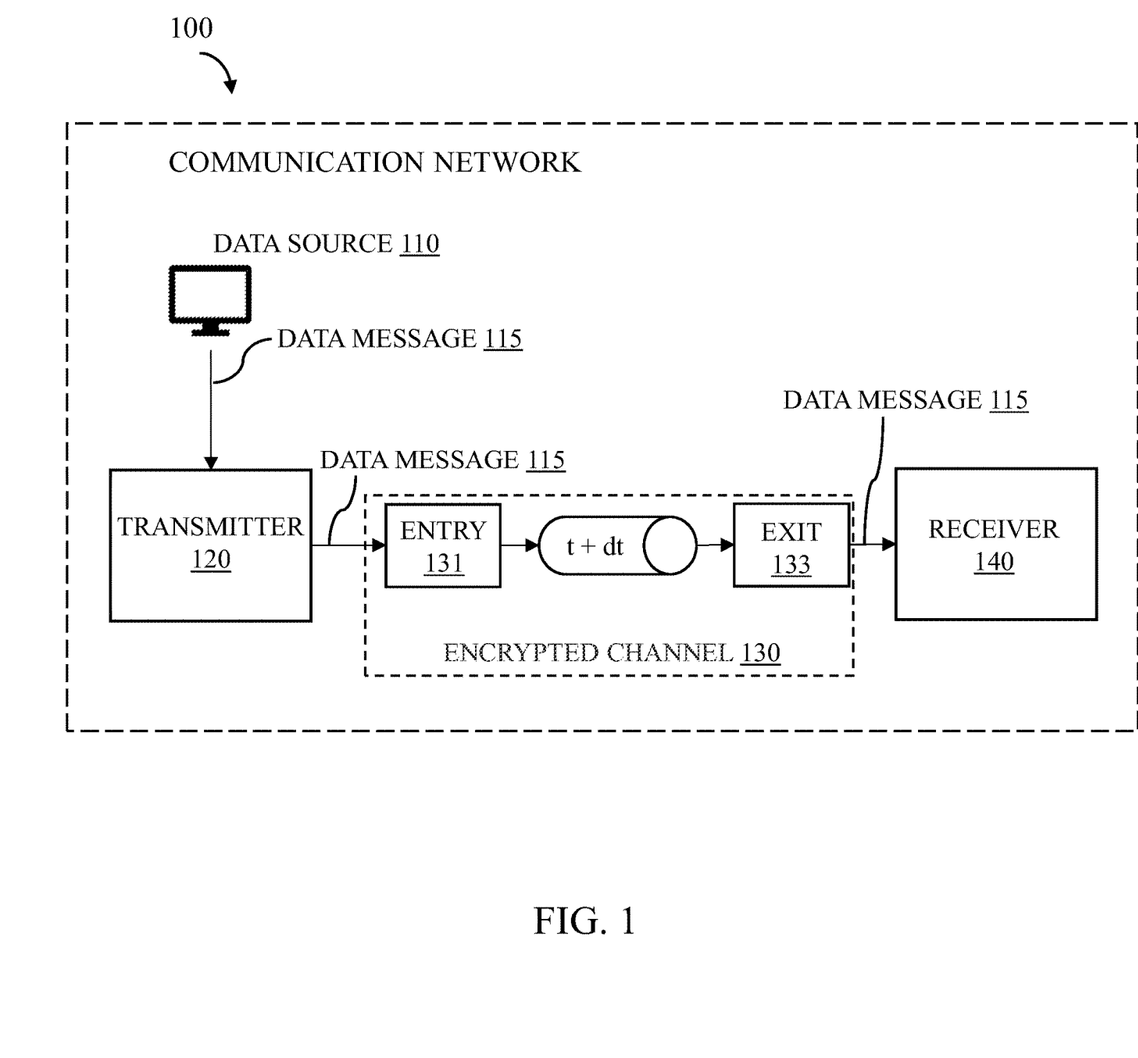
FIG. 1 depicts an example data transmission system with an encrypted channel with levelized and random latency.

FIG. 1 depicts an example data transmission system with an encrypted channel with levelized and random latency. In FIG. 1, a data source 110 may send a data message 115. In some embodiments, the data source 110 may be a computer or a computer system having data, and the data source 110 may be controlled by a user, such as a trader. In some embodiments, the data message 115 may be of a particular type. For example, the data message 115 may be a transaction order data type. For example, the data message may include at least one trading activity.

In some embodiments, the data message 115 may comprise a transaction order or order commitments. The order or order commitments may include an instruction to buy or sell at least one of: a financial instrument, an equity, a stock, a bond, a mutual fund, an option, a bank note, a security, debt, a contract, an exchanged traded fund, an index fund, a currency, an asset, a liability, a portfolio of assets, a commodity, a future, a derivative, and/or a hedge.

A transmitter 120 may receive the data message 115 sent by the data source 110. In some embodiments, the transmitter 120 may be a computer or a computer system, and the transmitter 120 may be controlled by an exchange, an off-exchange trading pool, and/or a venue that facilitates continuous financial trading. The transmitter 120 may include one or more computers or computer systems capable of, for example, receiving, encrypting, delaying, decrypting, transmitting, opening, verifying, and executing orders or order commitments contained in the data messages 115. In some embodiments, trading platforms may determine to use or not to use the encrypted channel 130 for transmitting data messages.

In some embodiments, the data source 110 and the transmitter 120 may be part of the same network node. The transmitter 120 may transmit the data message 115 to a receiver 140 using an encrypted channel 130.

In some embodiments, the transmitter 120 may determine a latency imposed on the data message 115 transmitted on the encrypted channel 130. In some embodiments, the receiver 140 may determine a latency imposed on the data message 115 received over the encrypted channel 130. The latency determined may be a random value. In some embodiments, the value of the latency may comprise a fixed component t and a random component dt, and the value of the latency may be the summation of the fixed component t and the random component dt. In some embodiments, the latency may have a minimum and a maximum. In some embodiments, the minimum latency may be greater than zero.

In some embodiments, the data message 115 may enter the encrypted channel 130 at an entry 131 and may exit the encrypted channel 130 to a next destination at an exit 133. The random latency imposed on the data message 115 may be the time between the entry 131 and the exit 133. The random latency may be a sum of the fixed component and the random component, which may be represented as t+dt. In some embodiments, the fixed component may comprise an inherent latency of the communications network (e.g., satellites).

In some embodiments, the data message 115 may include a time stamp. For example, the data source 110 or the transmitter 120 may add a time stamp to the data message 115. For example, the time stamp may be added to the data message prior to transmission. The latency imposed on the message 115 may be based on the time stamp. For example, the predetermined fixed component may be a minimum fixed latency requirement for the transmission channel, and the time stamp may be used to determine whether additional delay needs to be added to meet the minimum fixed latency requirement. For example, a message travel time may be determined at the exit point by comparing the time stamp to the current time. For example, the message travel time may be determined after the data message is received. If a message travel time v is less than the fixed component of the latency, the final latency may be determined as the difference between the fixed component and the message travel time, plus the random component, namely (t−v+dt). Generally, the fixed component t (minimum latency) will be set large enough so that it will equal or exceed the actual travel time v. If the message travel time v is greater than the fixed component of the latency, that message may be handled as an exception. Using rules specified in advance, such exceptions may be handled by simply adding the random component, so that the final latency is v+dt. Alternatively, such exceptions may simply be cancelled as a result of excessive delay.

In some embodiments, the encrypted channel 130 may be configured to transmit the data message 115 with levelized and randomized latency within a particular range, and being unpredictable, so that information about the origin of the message may not be conveyed during transmission. Within the geographic footprint of the encrypted-latency channel 130, all points on the communication network 100 may be considered to be effectively equidistant from one another.

In some embodiments, the receiver 140 may be a computer or a computer system, and the receiver 140 may be controlled by an exchange, an off-exchange trading pool, and/or a venue that facilitates continuous financial trading. The receiver 140 may include one or more computers or computer systems capable of, for example, receiving, delaying, decrypting, opening, verifying, and executing orders or order commitments contained in the data messages 115. In some embodiments, trading platforms may determine to use or not to use the encrypted channel 130 for transmitting data messages.

Figure 2:
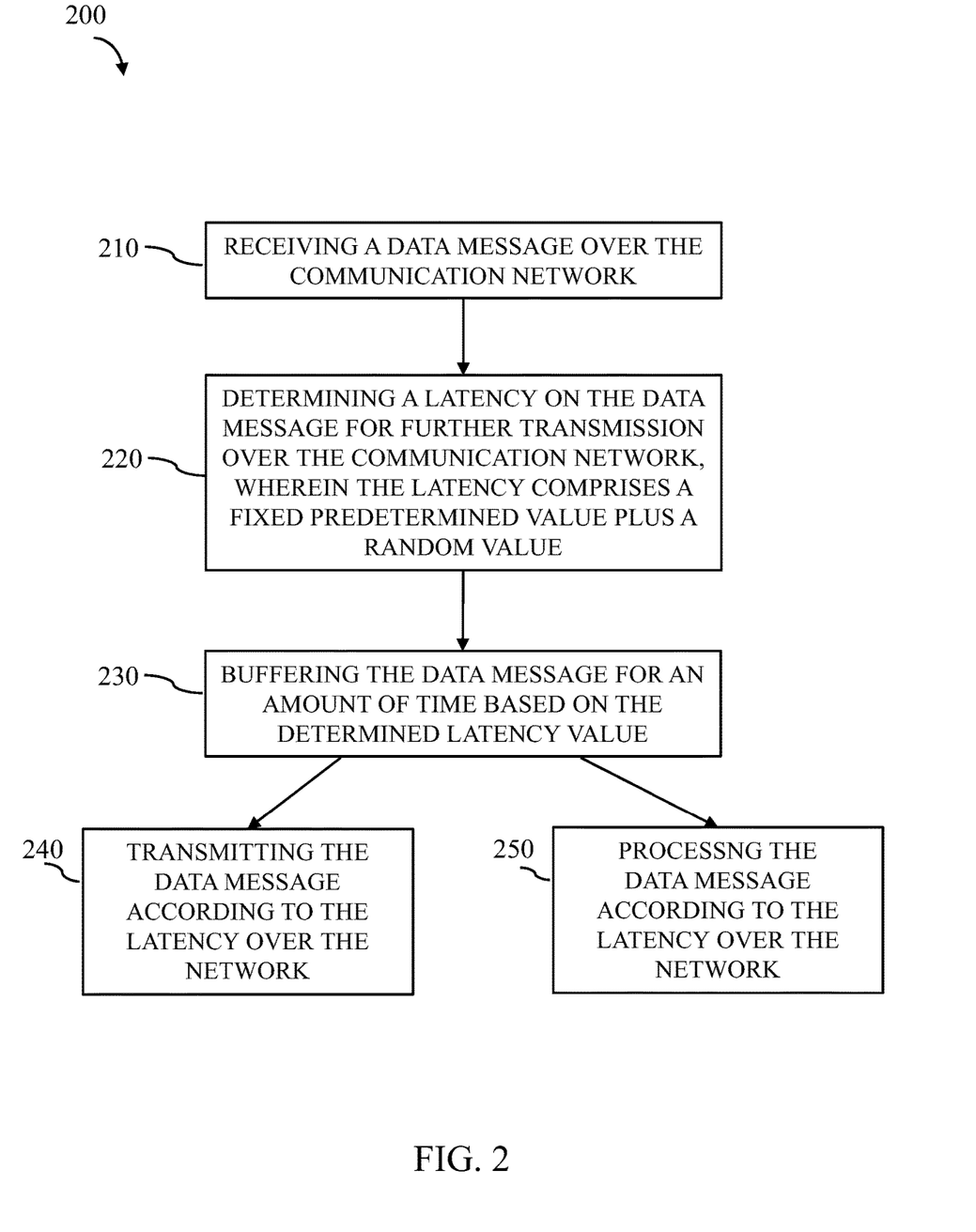
FIG. 2 depicts an illustrative method of imposing latency in data transmission.

As shown in FIG. 2, the latency is imposed on the data message 115 by an encrypted channel 130. In some embodiments, the data source 110, the transmitter 120, the encrypted channel 130, the receiver 140, and/or another device may impose the latency on the data message 115.

FIG. 2 depicts an illustrative method of imposing latency in data transmission. In step 210, flow may begin with receiving a data message 115 over the communication network 100, by a network node. In some embodiments, the network node may comprise data devices, computers, routers, servers, etc. For example, the network node may be the transmitter 120; alternatively, the network node may be the data source 110 (e.g., trader). The network node may receive one or more data messages 115, In some embodiments, the one or more data messages 115 may comprise a plurality of types. For example, the plurality of data message types may comprise transaction orders.

In step 220, upon the receiving of one or more data messages 115, the network node (e.g., transmitter 120) may determine the latency for the data message for further transmission over the communication network. In some embodiments, the latency may comprise a predetermined value and a random value. The latency may be a summation of the predetermined fixed value plus the random value. In some embodiments, the latency may be within a particular range such that the latency being greater than or equal to a minimum latency and less than or equal to a maximum latency. In some embodiments, the predetermined value may be identical for the one or more data messages; however, the random value may be determined for each of the one or more data messages based on a random distribution. In some embodiments, the predetermined value may be the minimum latency of the particular range, and the random value may be determined based on the random distribution in between the minimum latency and the maximum latency.

In step 230, after the network node determines the latencies for the one or more data messages, the network node may buffer the one or more data messages 115 for an amount of time based on the determined latency. From step 230, the flow may proceed to step 240 or step 250.

In step 240, the network node may transmit the one or more data messages 115 over the communication network 100 after the latency period has expired. For example, the transmitter 120 may transmit the delayed data message to the receiver 140. For example, the data source 110 may transmit the delayed data message to the transmitter 120.

In step 250, the network node may process the data message 115 after the latency period has expired. For example, the receiver 140 may impose the latency on the data message 115, the receiver 140 may process the message (e.g., execute the order).

Illustrative Apparatus

Figure 3:
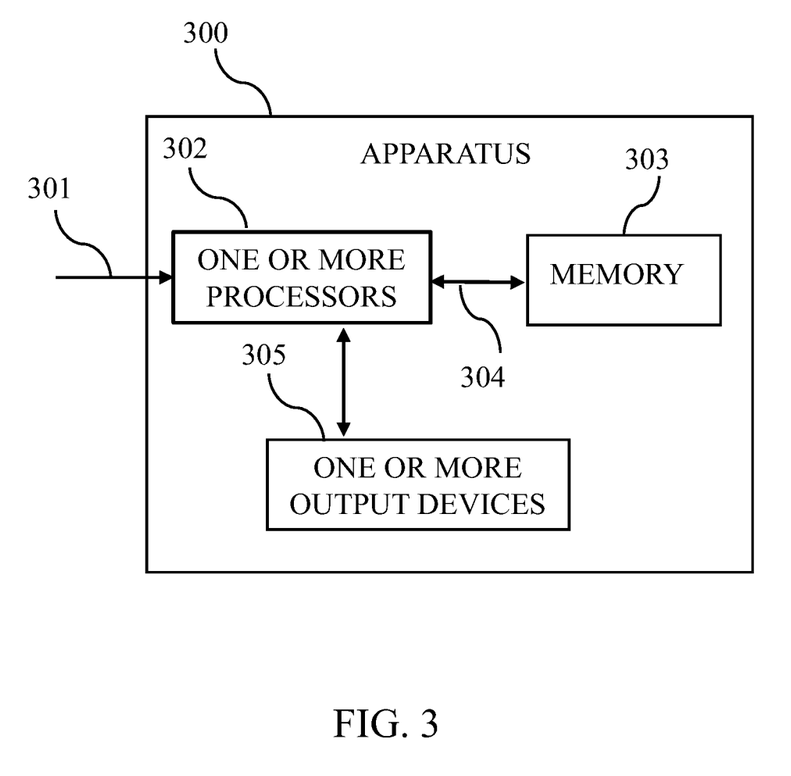
FIG. 3 depicts an illustrative apparatus.

FIG. 3 illustrates an example of an apparatus to implement one or more exemplary embodiments discussed herein. In this example, the apparatus 300 may include one or more processors 302, one or more output devices 305, and a memory 303.

In one embodiment, the one or more processors 302 may include a general purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

In one example, based on user input 301 and/or other input from a computer network, the one or more processors 302 may execute instructions stored in memory 303 to perform one or more exemplary embodiments described herein. Output produced by the one or more processors 302 executing the instructions may be output on the one or more output devices 305 and/or output to the computer network.

The memory 303 may be accessible by the one or more processors 302 via the link 304 so that the one or more processors 302 can read information from and write information to the memory 303. Memory 303 may be integral with or separate from the processors. Examples of the memory 303 include RAM, flash, ROM, EPROM, EEPROM, registers, disk storage, or any other form of storage medium. The memory 303 may store instructions that, when executed by the one or more processors 302, implement one or more embodiments of the invention. Memory 303 may be a non-transitory computer-readable medium that stores instructions, which when executed by a computer, cause the computer to perform one or more of the exemplary methods discussed herein.

Figure 4:
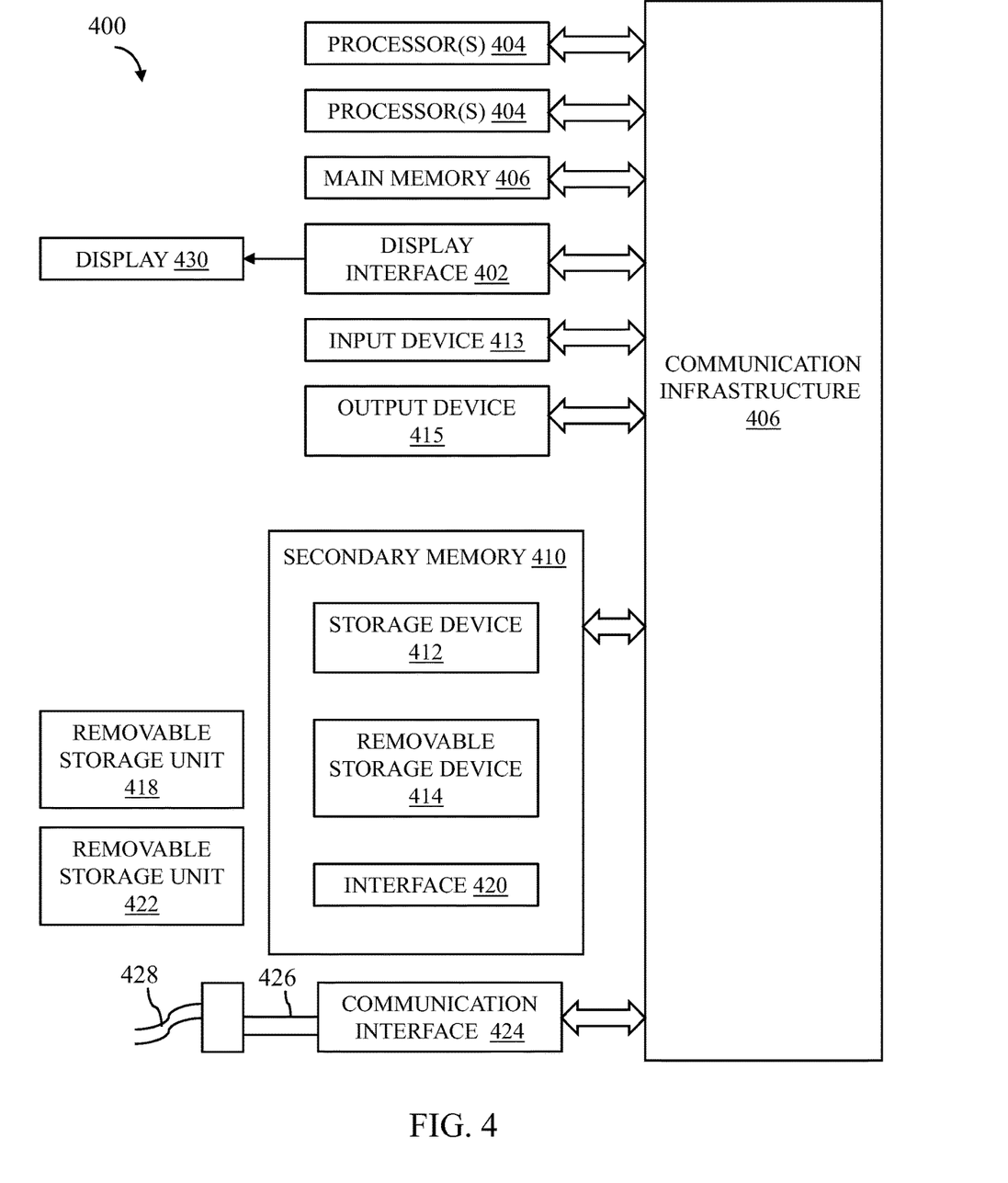
FIG. 4 depicts another illustrative apparatus.

FIG. 4 illustrates an example of another apparatus to implement one or more exemplary embodiments discussed herein. In this example, an illustrative computer system may be used in implementing an illustrative embodiment of the embodiments described herein. Specifically, FIG. 4 depicts an illustrative embodiment of a computer system 400 that may be used in computing devices such as, e.g., but not limited to, standalone or client or server devices. FIG. 4 depicts an illustrative embodiment of a computer system that may be used as client device, or a server device, etc. The invention (or any part(s) or function(s) thereof) may be implemented using hardware, software, firmware, or a combination thereof and may be implemented in one or more computer systems or other processing systems. In an illustrative embodiment, the invention may be directed toward one or more computer systems capable of carrying out the functionality described herein.

An example of a computer system 400 is shown in FIG. 4, depicting an illustrative embodiment of a block diagram of an illustrative computer system useful for implementing the invention. Specifically, FIG. 4 illustrates an example computer 400, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/etc. available from MICROSOFT® Corporation of Redmond, Wash., U.S.A. or an Apple computer executing MAC® OS from Apple® of Cupertino, Calif., U.S.A. However, the invention is not limited to these platforms. Instead, the invention may be implemented on any appropriate computer system running any appropriate operating system. In one illustrative embodiment, the invention may be implemented on a computer system operating as discussed herein. An illustrative computer system, computer 400 is shown in FIG. 4. Other components of the invention, such as, e.g., (but not limited to) a computing device, a communications device, a telephone, a personal digital assistant (PDA), an iPhone, an iPad, a 3/4/5G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 4. Computer system 400 may be connected to a network and/or interact with a networked cloud of computers.

The computer system 400 may include one or more processors, such as, e.g., but not limited to, processor(s) 404. The processor(s) 404 may be connected to a communication infrastructure 406406 (e.g., but not limited to, a communications bus, cross-over bar, interconnect, or network, etc.). Processor 404 may include any type of processor, microprocessor and/or processing logic that may interpret and execute instructions (e.g., for example, a field programmable gate array (FPGA)). Processor 404 may comprise a single device (e.g., for example, a single core) and/or a group of devices (e.g., multi-core). The processor 404 may include logic configured to execute computer-executable instructions configured to implement one or more embodiments. The instructions may reside in main memory 308 or secondary memory 410. Processors 404 may also include multiple independent cores, such as a dual-core processor or a multi-core processor. Processors 404 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

In one embodiment, the one or more processors 404 may include a general purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

Computer system 400 may include a display interface 402 that may forward, e.g., but not limited to, graphics, text, and other data, etc., from the communication infrastructure 406 (or from a frame buffer, etc., not shown) for display on the display unit 430. The display until 430 may be, for example, a television, a computer monitor, or a mobile phone screen. The output may also be provided as sound through a speaker.

The computer system 400 may also include, e.g., but is not limited to, a main memory 308, random access memory (RAM), and a secondary memory 410, etc. Main memory 308, random access memory (RAM), and a secondary memory 410, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 410 may include, for example, (but is not limited to) a hard disk drive 412 and/or a removable storage drive 414, representing a floppy diskette drive, a magnetic tape drive, an optical disk drive, a compact disk drive CD-ROM, flash memory, etc. The removable storage drive 414 may, e.g., but is not limited to, read from and/or write to a removable storage unit 418 in a well-known manner. Removable storage unit 418, also called a program storage device or a computer program product, may represent, e.g., but is not limited to, a floppy disk, magnetic tape, optical disk, compact disk, etc. which may be read from and written to removable storage drive 414. As will be appreciated, the removable storage unit 418 may include a computer usable storage medium having stored therein computer software and/or data.

In alternative illustrative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

As an example, the main memory 308 and/or the secondary memory 410 may store instructions for implementing the steps 210-240 or steps 210-230 and 250 as illustrated in FIG. 2.

Computer 400 may also include an input device 413 may include any mechanism or combination of mechanisms that may permit information to be input into computer system 400 from, e.g., a user. Input device 413 may include logic configured to receive information for computer system 400 from, e.g., a user. Examples of input device 413 may include, e.g., but not limited to, a mouse, pen-based pointing device, or other pointing device such as a digitizer, a touch sensitive display device, and/or a keyboard or other data entry device (none of which are labeled). Other input devices 413 may include, e.g., but not limited to, a biometric input device, a video source, an audio source, a microphone, a web cam, a video camera, and/or other cameras. Input device 413 may communicate with processor 404 either wired or wirelessly.

Computer 400 may also include output devices 415 which may include any mechanism or combination of mechanisms that may output information from computer system 400. Output device 415 may include logic configured to output information from computer system 400. Embodiments of output device 415 may include, e.g., but not limited to, display 430, and display interface 402, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 400 may include input/output (I/O) devices such as, e.g., (but not limited to) communications interface 424, cable 428 and communications path 426, etc. These devices may include, e.g., but are not limited to, a network interface card, and/or modems. Output device 415 may communicate with processor 404 either wired or wirelessly.

Communications interface 424 may allow software and data to be transferred between computer system 400 and external devices.

In this document, the terms "computer program medium" and "computer readable medium" may be used to generally refer to media such as, e.g., but not limited to, removable storage drive 414, a hard disk installed in hard disk drive 412, flash memories, removable discs, non-removable discs, etc. In addition, it should be noted that various electromagnetic radiation, such as wireless communication, electrical communication carried over an electrically conductive wire (e.g., but not limited to twisted pair, CATS, etc.) or an optical medium (e.g., but not limited to, optical fiber) and the like may be encoded to carry computer-executable instructions and/or computer data that embodiments of the invention on e.g., a communication network. These computer program products may provide software to computer system 400. It should be noted that a computer-readable medium that comprises computer-executable instructions for execution in one or more processors may be configured to store various embodiments of the invention.

As discussed herein, numerous specific details such as logic implementations, types and interrelationships of system components, etc. are set forth to provide a more thorough understanding of particular embodiments. It should be appreciated by one skilled in the art that the particular embodiments may be practiced without such specific details. In other instances, control structures, circuits and instruction sequences have not been shown in detail to not obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An electronic device stores and transmits (internally and/or with other electronic devices) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data.

For example, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical interfaces to establish connections (to transmit and/or receive code and/or data using propagating signals) with other electronic devices. One or more parts of an embodiment of the present disclosure may be implemented using different combinations of software, firmware, and/or hardware.

ILLUSTRATIVE EMBODIMENTS

The invention includes other illustrative embodiments, such as the following.

Illustrative Embodiment 1. A computer-implemented method, performed by a network node in a communication network, for inducing latency in data transmission, the method comprising receiving a data message over the communication network; determining a latency on the data message for further transmission over the communication network, wherein the latency is based on a predetermined fixed value plus a random value; buffering the data message for an amount of time based on the determined latency; and at least one of transmitting the data message over the communication network or processing the data message once buffering is complete.

Illustrative Embodiment 2. The computer-implemented method of Illustrative Embodiment 1, wherein the data message is given a time stamp prior to transmission, and the latency is determined after the data message is received, based on the time stamp.

Illustrative Embodiment 3. The computer-implemented method of Illustrative Embodiment 2, wherein the predetermined fixed value is a minimum fixed latency requirement, and the time stamp is used to determine whether additional delay needs to be added to meet the minimum fixed latency requirement.

Illustrative Embodiment 4. The computer-implemented method of Illustrative Embodiment 1, wherein the latency is greater than or equal to a minimum latency and less than or equal to a maximum latency.

Illustrative Embodiment 5. The computer-implemented method of Illustrative Embodiment 4, wherein the predetermined value is the minimum latency, and the random value being a random distribution in between the minimum latency and the maximum latency.

Illustrative Embodiment 6. The computer-implemented method of Illustrative Embodiment 1, wherein the data message comprises at least one trading activity.

Illustrative Embodiment 7. The computer-implemented method of Illustrative Embodiment 1, wherein the data message is transmitted according to the imposed latency over the communication network using an encrypted channel.

Illustrative Embodiment 8. The computer-implemented method of Illustrative Embodiment 7, wherein the encrypted channel coexists with one or more communication channels, wherein the communication channels are faster than the encrypted channel in transmitting the data message.

Illustrative Embodiment 9. The computer-implemented method of Illustrative Embodiment 1, wherein the data message is transmitted according to the imposed latency over the network via at least one satellite.

Illustrative Embodiment 10. A system comprising one or more processors and memory accessible by the one or more processors, the memory storing instructions that when executed by the one or more processors cause the system to perform a method comprising: receiving a data message over the communication network; determining a latency to impose on the data message for further transmission over the communication network, wherein the latency is based on a fixed predetermined value plus a random value; buffering the data message for an amount of time based on the determined latency; and at least one of transmitting the data message over the communication network or processing the data message once buffering is complete.

Illustrative Embodiment 11. The system of the illustrative embodiment of Illustrative Embodiment 10, wherein the latency is greater than or equal to a minimum latency and less than or equal to a maximum latency.

Illustrative Embodiment 12. The system of the illustrative embodiment of Illustrative Embodiment 11, wherein the predetermined value is the minimum latency, and the random value is a random distribution in between the minimum latency and the maximum latency.

Illustrative Embodiment 13. The system of the illustrative embodiment of Illustrative Embodiment 10, wherein the data message comprises at least one trading activity.

Illustrative Embodiment 14. The system of the illustrative embodiment of Illustrative Embodiment 10, wherein the data message is transmitted according to the imposed latency over the network using an encrypted channel.

Illustrative Embodiment 15. The system of the illustrative embodiment of Illustrative Embodiment 14, wherein the encrypted channel coexists with one or more communication channels, wherein the communication channels are faster than the encrypted channel in transmitting the data message.

Illustrative Embodiment 16. The system of the illustrative embodiment of Illustrative Embodiment 10, wherein the system of the illustrative embodiment, wherein the data message is transmitted according to the imposed latency over the network via at least one satellite.

Illustrative Embodiment 17. One or more tangible non-transitory computer-readable storage media for storing computer-executable instructions executable by a computer system having at least one processor, the media storing one or more instructions to receive a data message over the communication network; determine a latency on the data message for further transmission over the communication network, wherein the latency is based on a predetermined fixed value plus a random value; buffer the data message for an amount of time based on the determined latency; and at least one of transmit the data message over the communication network or process the data message once buffering is complete.

Illustrative Embodiment 18. The media of the illustrative embodiment of Illustrative Embodiment 17, wherein the latency is greater than or equal to a minimum latency and less than or equal to a maximum latency.

Illustrative Embodiment 19. The media of the illustrative embodiment of Illustrative Embodiment 18, wherein the predetermined value is the minimum latency, and the random value is a random distribution in between the minimum latency and the maximum latency.

Illustrative Embodiment 20. The media of the illustrative embodiment of Illustrative Embodiment 17, wherein the data message is transmitted according to the imposed latency over the communication network using an encrypted channel.

Particular embodiments are described more fully herein. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments illustrated under any heading or in any portion of the disclosure may be combined with embodiments illustrated under the same or any other heading or other portion of the disclosure unless otherwise indicated herein or otherwise clearly contradicted by context.

Numerous modifications, alterations, and changes to the described embodiments are possible without departing from the scope of the present invention defined in the claims. It is intended that the present invention not be limited to the described embodiments, but that it has the full scope defined by the language of the following claims, and equivalents thereof

What is claimed is:

1. A computer-implemented method, performed by a network node in a communication network, for inducing latency in data transmission, the method comprising:
    receiving a data message over the communication network;
    determining a latency on the data message for further transmission over the communication network, wherein the latency is based on a predetermined fixed value plus a random value, and has an expected value that is the same regardless of a point of entry and a point of delivery of the message;
    buffering the data message for an amount of time based on the determined latency; and
    at least one of transmitting the data message over the communication network or processing the data message once buffering is complete.

2. The computer-implemented method of claim 1, wherein the data message is given a time stamp prior to transmission, and the latency is determined after the data message is received, based on the time stamp.

3. The computer-implemented method of claim 2, wherein the predetermined fixed value is a minimum fixed latency requirement, and the time stamp is used to determine whether additional delay needs to be added to meet the minimum fixed latency requirement.

4. The computer-implemented method of claim 1, wherein the latency is greater than or equal to a minimum latency and less than or equal to a maximum latency.

5. The computer-implemented method of claim 4, wherein the predetermined value is the minimum latency, and the random value being a random distribution in between the minimum latency and the maximum latency.

6. The computer-implemented method of claim 1, wherein the data message comprises at least one trading activity.

7. The computer-implemented method of claim 1, wherein the data message is transmitted according to the imposed latency over the communication network using an encrypted channel.

8. The computer-implemented method of claim 7, wherein the encrypted channel coexists with one or more communication channels, wherein the communication channels are faster than the encrypted channel in transmitting the data message.

9. The computer-implemented method of claim 1, wherein the data message is transmitted according to the imposed latency over the network via at least one satellite.

10. A system comprising one or more processors and memory accessible by the one or more processors, the memory storing instructions that when executed by the one or more processors cause the system to perform a method comprising:
    receiving a data message over the communication network;
    determining a latency to impose on the data message for further transmission over the communication network, wherein the latency is based on a fixed predetermined value plus a random value, and has an expected value that is the same regardless of a point of entry and a point of delivery of the message;
    buffering the data message for an amount of time based on the determined latency; and
    at least one of transmitting the data message over the communication network or processing the data message once buffering is complete.

11. The system of claim 10, wherein the latency is greater than or equal to a minimum latency and less than or equal to a maximum latency.

12. The system of claim 11, wherein the predetermined value is the minimum latency, and the random value is a random distribution in between the minimum latency and the maximum latency.

13. The system of claim 10, wherein the data message comprises at least one trading activity.

14. The system of claim 10, wherein the data message is transmitted according to the imposed latency over the network using an encrypted channel.

15. The system of claim 14, wherein the encrypted channel coexists with one or more communication channels, wherein the communication channels are faster than the encrypted channel in transmitting the data message.

16. The system of claim 10, wherein the data message is transmitted according to the imposed latency over the network via at least one satellite.

17. One or more tangible non-transitory computer-readable storage media for storing computer-executable instructions executable by a computer system having at least one processor, the media storing one or more instructions to:
   receive a data message over the communication network;
   determine a latency on the data message for further transmission over the communication network, wherein the latency is based on a predetermined fixed value plus a random value, and has an expected value that is the same regardless of a point of entry and a point of delivery of the message;
   buffer the data message for an amount of time based on the determined latency; and
   at least one of transmit the data message over the communication network or process the data message once buffering is complete.

18. The media of claim 17, wherein the latency is greater than or equal to a minimum latency and less than or equal to a maximum latency.

19. The media of claim 18, wherein the predetermined value is the minimum latency, and the random value is a random distribution in between the minimum latency and the maximum latency.

20. The media of claim 17, wherein the data message is transmitted according to the imposed latency over the communication network using an encrypted channel.

\* \* \* \* \*